Figure 1:

Jan. 5, 1965 E. KOOI 3,164,499

METHOD OF PROVIDING ALLOY CONTACTS ON SEMI-CONDUCTOR BODIES

Filed Sept. 12, 1961

INVENTOR
ELSE KOOI
BY
AGENT

United States Patent Office 3,164,499
Patented Jan. 5, 1965

3,164,499
METHOD OF PROVIDING ALLOY CONTACTS ON SEMI-CONDUCTOR BODIES
Else Kooi, Eindhoven, Netherlands, assignor to North American Philips Company, Inc., New York, N.Y., a corporation of Delaware
Filed Sept. 12, 1961, Ser. No. 137,606
Claims priority, application Netherlands Sept. 13, 1960
6 Claims. (Cl. 148—179)

The invention relates to a method of providing alloy contacts on semi-conductor bodies, in which method pellets of the alloying material are arranged so as to engage a semiconductor body by means of a jig having apertures in each of which such a pellet is disposed, after which the pellets are alloyed to the body.

The expression "pellets" as used herein is not restricted to bodies of spherical shape but also includes other appropriate shapes, for example, disc-shaped or filamentary bodies. The above-mentioned known method is used, for example, for manufacturing semi-conductive electrode systems, such as transistors and diodes.

It is known to arrange the pellets in a jig so as to engage the body and then to heat the whole to the alloying temperature. It is also known to arrange the pellets in a jig so as to engage the body, to fuse them to the body at a low temperature, after which the jig is removed and the actual alloying process is carried out without the use of a jig.

It has been found that the presence of the jig in the fusing and, as the case may be, alloying processes may give rise to the introduction of impurities. It has also been found that the molten alloying material tends to adhere to the jig. Consequently, the choice of the material of the jigs is restricted to materials which are not readily wetted and evolve little impurity, such as graphite and stainless steel.

It is an object of the invention to obviate these disadvantages. According to the invention, the pellets while disposed in the jig are stuck to the semi-conductor body by means of an adhesive, after which the jig is removed and the pellets are alloyed to the body. During the use of the jig no heat need be applied.

Preferably an adhesive is used which consists of a material which is volatilized during the fusing process, for example an oil produced as a distillate. The adhesive preferably also contains a flux to ensure satisfactory wetting of the surface of the body by the alloying material during the alloying process. This flux may be the adhesive itself.

The method in accordance with the invention is particularly suited for providing alloy contacts containing gallium on semi-conductor bodies. Gallium and gallium alloys when molten have the property of adhering to substantially any solid material with which they come into contact.

In order that the invention may be readily carried out, an embodiment thereof will now be described more fully, by way of example, with reference to the accompanying diagrammatic drawing, the figures of which are vertical sectional views of various stages of a process of providing alloy contacts on a semi-conductor body. In the figures, like components are designated by the same reference numerals.

In FIGURE 1, a semi-conductor body 1, consisting of p-type germanium, has its upper surface covered with a layer 2 of an adhesive. This layer may be provided by dipping the body into a one-half percent solution of neat's-foot oil (oleum pedum tauri) in acetone. After extracting the body from the solution the surface of the body is covered with a layer of the solution, having a thickness of about 100 microns, from which the solvent evaporates rapidly leaving an extremely thin layer of neat's-foot oil behind, forming the adhesive. Neat's-foot oil is a purified distillate from bone-oil and will evaporate entirely on heating.

Figure 2:
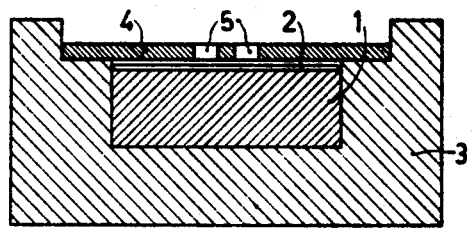

The body is accommodated in a holder 3 (FIGURE 2). A plate-shaped jig 4, which may consist of copper and has apertures 5, is arranged on this holder. The apertures may for instance have diameters of 50 microns and may be 30 microns apart.

Figure 3:
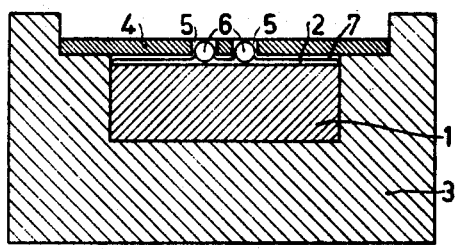

In the apertures 5, pellets 6 of the alloying material, in the present case consisting of a lead-arsenic alloy and having a diameter of 45 microns, are disposed, f.i., by rolling over the jig 4, so as to adhere to the semi-conductor body 1 by means of the adhesive of the layer 2 (FIGURE 3). Between the jig 4 and the body 1, a slight spacing 7 is permissible. However, this spacing has to be smaller than the diameter of the pellets 6 so that the latter cannot find their way into the interstice between the jig and the body. By this spacing the jig 4 is prevented from adhering to the body 1.

Figure 4:
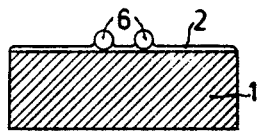

The plate-shaped jig 4 is now removed from the holder 3. The body 1 can be taken from the holder 3, the pellets 6 remaining in position (FIGURE 4), also when the body is turned upside down with the pellets hanging underneath the body.

Figure 5:
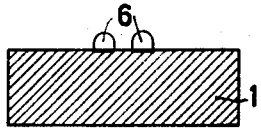

The semi-conductor body 1 is now heated, for example in a conventional furnace, using a hydrogen atmosphere or other inert atmosphere, to a temperature of about 500° for about 2 minutes to fuse the pellets 6 to the body 1 (FIGURE 5). During this heat treatment, the adhesive disappears.

The body and pellets fused to it may be treated further in the manufacture of a transistor, for instance in the following way, known per se, added for the sake of completeness, but in itself not important for the underlying invention.

On top of only one pellet a small dot of aluminum paint is applied, and the body is heated to a temperature of 700° C. for two hours, the pellets being remelted, aluminum dissolving in the molten material of said one pellet and arsenic partly diffusing from the molten pellets into the body, partly evaporating and diffusing in the exposed surface parts of the body forming an n-type surface layer. When cooling down, firstly germanium, dissolved in the molten material of the pellets by the heat treatment, segregates onto the undissolved germanium of the body after which the rest of the material of the pellets solidifies on top of the segregated layers. In the case of said one pellet containing aluminum, the segregated layer is p-type, forming a p-n-junction with the n-type layer formed by the diffusion of arsenic. In the case of the other pellet the segregated layer is n-type. After removing the n-type surface layer from the side of the body opposite to the pellets and attaching a nickel tab to said side by means of a solder consisting of indium and gallium and attaching tinned wires to the pellets, a p-n-p-transistor is formed in which the nickel tab forms the collector connection, the said one pellet forms the emitter electrode and the other pellet forms the base electrode.

The single jig described hereinbefore may obviously be replaced by a multiple jig for providing pellets on several semi-conductor bodies. Alternatively, several plate-shaped jigs may be employed with a holder containing one or several semi-conductor bodies.

Instead of neat's-foot oil many other adhesives may be used, for example other oils, greases and fats, preferably applied as a solution in a solvent, rapidly evaporating at room temperatures, such that an extremly thin layer of the adhesive may be formed.

As a few examples of suitable solvents out of many possibilities, we may mention acetone for polyalcohols, vegetable and animal oils and fats, methanol for polyalcohols, such as glycol and glycerol, which are also suitable adhesives, and trichlorethene for mineral oils, greases and fats. For instance in a modification of the above example a one-half percent solution of liquid paraffin in trichlorethene was used. The adhesives may preferably be chosen such that they will evaporate entirely on heating. So oils are preferred over fats and greases.

Mostly very diluted solutions of the adhesives, f.i., up to 1%, are suitable as normally very small pellets, f.i., up to 200 microns, are used in the manufacture of semiconductor electrode systems. However, when using substantially large pellets more concentrated solutions may be chosen.

To the adhesives fluxes may be added, f.i., in finely divided form, or if possible it may be dissolved in the adhesive or the solvent; in the latter case the flux may segregate in a finely divided state, mixed with the adhesive after the evaporation of the solvent. Well-known fluxes may be used such as zinc chloride, indium chloride or ammonium fluoride.

Although by way of example the application of two electrodes at one side of a semi-conductor body is described, the invention is not restricted thereto. For instance also one or more than two electrodes at one side or electrodes at different, f.i., opposite sides, of a semi-conductor body may be applied using the invention and a jig having apertures at opposite sides of the semi-conductor body. Jigs of this type, consisting of graphite, are well-known in the art, but such jigs are also used during the heating operation in melting the pellets. It is also known, especially in manufacturing germanium p-n-p-transistors by melting donor materials onto opposite sides of an n-type germanium body, to use an emitter pellet consisting of an indium-gallium alloy. In particular such an alloy containing gallium, when in the molten state, often tends to adhere to graphite. By covering the germanium surface with an adhesive, f.i., as described above, and placing the body in a jig with apertures at opposite sides of the body and introducing gallium containing pellets in the apertures such that they adhere to the germanium body by means of the adhesive, the jig parts may be removed before any heating operation to melt the pellets is carried out, such that in a subsequent heating operation the molten pellets cannot adhere to other members than the germanium body itself.

It is remarked further that the invention is not limited to the use of a semi-conductor body consisting of germanium, but may be applied also when semi-conductor bodies of other material are used, for instance of silicon or of an $A^{III}B^{V}$ compound. Anyhow it has been found that good results are obtained when adhering pellets of aluminum or tin onto silicon bodies by means of a jig and fusing them subsequently to the silicon bodies without the use of a jig. Also in these cases very good results were obtained when using an adhesive as mentioned above, such as neat's-foot oil adhesive solution in acetone or a liquid paraffin adhesive solution in trichlorethene.

Further the invention is not restricted to the choice of a special adhesive or a special group of adhesives as many other well known adhesives may prove to be of use in the methods according to the invention, for instance gums, starch and resins may be applied locally in the semiconductor body, preferably in such a manner that these adhesives do not touch any part of the jig.

The jigs may consist of a large variety of materials, such as all kinds of well-known suitably workable metals, alloys and hard plastics as no restriction as resistance to heating is necessary.

What is claimed is:

1. In the manufacture of a semiconductor device, a method of making an alloy contact to a selected surface portion of a semiconductive body, comprising providing on the said surface portion a very thin layer of a solution of an adhesive which will substantially completely volatilize upon heating and selected from the group consisting of oils, greases and fats in a solvent, which solvent rapidly evaporates at room temperature leaving a thin layer of a member of the said group as an adhesive behind, providing a jig containing an aperature over the said selected surface portion but spaced therefrom and disposing in said aperture onto the adhesive-coated surface portion a mass of contact material capable of producing one of an ohmic and rectifying contact to the semiconductive body to cause the mass to adhere to the said selected surface portion where the contact is to be made, thereafter removing the jig, thereafter heating the body with the adhering mass at a temperature at which the mass melts, wets and fuses to the said body surface portion and the adhesive volatilizes and is substantially completely removed from the body, and thereafter cooling the melt forming the desired alloy contact at the selected surface portion of the semiconductor.

2. A method as set forth in claim 1 wherein the solution further contains a flux to improve wetting which remains in the adhesive after the solvent has evaporated.

3. A method as set forth in claim 1 wherein the adhesive is neat's-foot oil.

4. A method as set forth in claim 1 wherein the adhesive is liquid paraffin.

5. In the manufacture of a semiconductor device, a method of making a gallium-containing alloy contact to a selected surface portion of a semiconductive body, comprising providing on the said surface portion a very thin layer of a less than 1% solution of an adhesive which will completely volatilize upon heating and selected from the group consisting of oils, greases and fats in a solvent, which solvent rapidly evaporates at room temperature leaving an extremely thin layer of a member of the said group as an adhesive behind, providing a jig containing an aperture over the said selected surface portion but spaced therefrom and disposing in said aperture onto the adhesive-coated surface portion a mass of gallium-containing contact material capable of producing one of an ohmic and rectifying contact to the semiconductive body to cause the mass to adhere to the said selected surface portion where the contact is to be made, thereafter removing the jig, thereafter heating the body with the adhering mass at a temperature at which the mass melts, wets and fuses to the said body surface portion and the adhesive is volatilized and completely removed from the body and thereafter cooling the melt forming the desired alloy contact at the selected surface portion of the semiconductor.

6. A method as set forth in claim 5 wherein the adhesive is an oil produced as a distillate.

References Cited in the file of this patent

UNITED STATES PATENTS

| 2,739,881 | Kepple | Mar. 27, 1956 |
| 2,825,667 | Mueller | Mar. 4, 1958 |
| 2,964,431 | Kalish | Dec. 13, 1960 |
| 3,003,798 | Sandlin | Oct. 10, 1961 |